June 15, 1926.  
H. W. NORDYKE  
1,589,212  
STORAGE BATTERY SEPARATOR AND PROCESS OF MANUFACTURE  
Filed Oct. 30, 1922
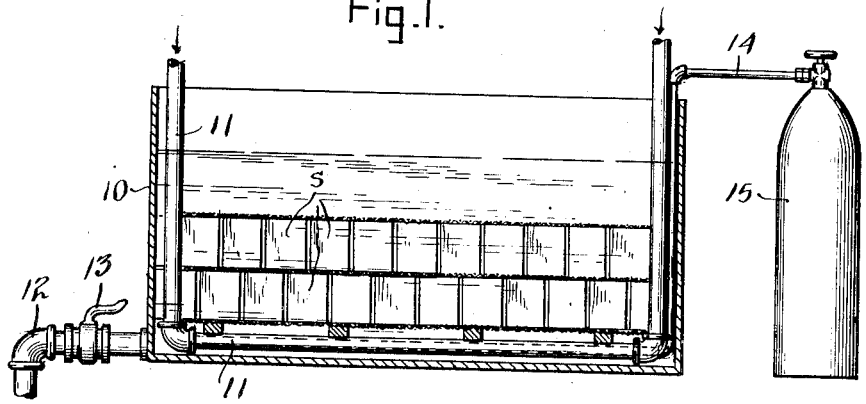
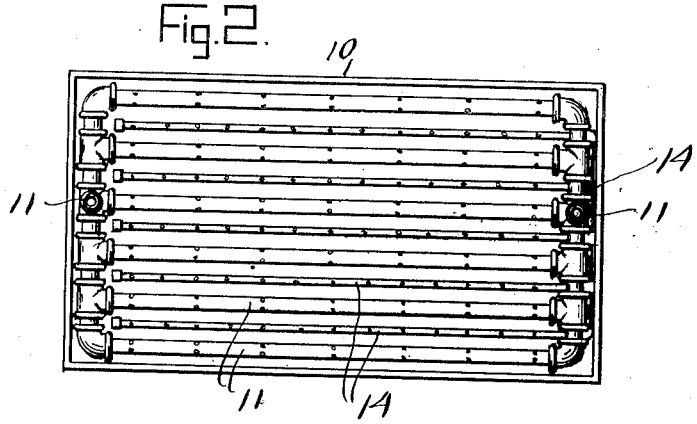
Inventor  
Horace W. Nordyke  
By  
Attorney Patented June 15, 1926.

1,589,212

UNITED STATES PATENT OFFICE.

HORACE W. NORDYKE, OF INDIANAPOLIS, INDIANA, ASSIGNOR TO INDIANAPOLIS MANUFACTURING COMPANY, OF INDIANAPOLIS, INDIANA, A CORPORATION OF INDIANA.

STORAGE-BATTERY SEPARATOR AND PROCESS OF MANUFACTURE.

Application filed October 30, 1922. Serial No. 597,974.

This invention consists in the method and means for treating woods for separators for storage batteries and in the improved separator resulting from such treatment. Its principle advantage consists in affording a separator of extremely low electrical resistance, still having all of the desirable mechanical strength and long life properties which are generally characteristic of separators of much higher electrical resistance. We have discovered that it is possible to lower the electrical resistance of a wood separator after the deposits of gum and resinous materials, which are ordinarily found in pockets or in the pores of the wood, have been removed.

When all of these materials have been removed, there still remains in many woods which are suitable for wood separator manufacture, substances (usually tannin, gums, resins, pigments, oils, and similar materials) which have been so thoroughly infiltrated into the cell wall structure that the common treating methods heretofore used, will not remove them. These substances are deposited or infiltrated into the cell wall structure during the lignification of the cell wall and during the period of time between the active and inactive portion of the cell life.

The young wood cell consists of a small amount of protoplasm, surrounded by a thin wall of pure cellulose. In the first stages of development into wood tissue, lignin is added to the inside of the cell wall and during the time of the active participation of this cell as a food and water carrier, very little of the substances referred to is deposited in the cell wall. As the growth of the tree progresses, the center of the trunk is left farther and farther away from the outside or active cell growth, and the cells in the center no longer take part in the transmission of food or liquid.

This center portion is commonly referred to as heart-wood and the outer portion as sap-wood. During the time of this transformation from sap-wood to heart-wood, the gummy, resinous and tannin materials are deposited within the cell wall structure. Their presence in this cell wall structure results in the material being non-hygroscopic and therefore prevents the rapid diffusion of water or acqueous solutions. Their action may be compared to the action of an oily paper in refusing to absorb water, and while the localized or pocketed gums and resins may be removed by the methods heretofore in use, we have found that it is necessary to sufficiently dilate the cell wall structure to enable the treating solution to have access to these infiltrated materials, in order to secure complete removal, and make all of the wood tissue high hygroscopic.

While this method may be used on various classes of woods, it is particularly designed to be applied to those having resins, gums, tannins, pigments, and similar materials infiltrated into the cell wall structure. Such infiltrated substances are not removed by methods heretofore in use and result in high electrical resistance when the woods are used for battery separators.

It is the particular object of this process, (1) to dilate the cell wall structure slightly, thereby opening or enlarging the bordered pits in such a manner as to permit a thorough diffusion of the treating solution and afford access to all of the resinous, gummy and other materials which have been deposited during the process of wood growth; (2) to remove by solution all soluble substances, and by distillation, the subsequent removal of the oily volatile materials which are released by heating the wood.

The novelty of the invention lies primarily in the use of a solution to dilate the cell structure and then subsequently the use of another solution which will by solution and by distillation remove the materials referred to, which result in the objectionable resistance in the separators. A further distinct advantage of this method is that it permits a slight softening of the cell wall structure during the treating process with a subsequent material hardening of the same cell wall structure after the resinous and gummy materials have been removed. This provides a separator having excellent mechanical properties as well as having extremely low electrical resistance.

By this process it is possible to obtain a separator of extremely low electrical resistance from those classes of woods the use of which has heretofore been objectionable on account of their extremely high electrical resistance, and at the same time due to the hardening effect of the later treatment, retain the durability and mechanical strength of separators of much higher resistance.

An apparatus such as found suitable in actual practice is illustrated by the accompanying drawing wherein Figure 1 is a longitudinal section and Figure 2 a horizontal section thereof.

Methods of treatment may be used in carrying out the process, substantially as follows:

The separators are placed in an open vat 10 containing a solution of water and substantially 5% of sodium hydrate or a mixture of sodium hydrate and carbonate. With the separators s submerged in this solution, live steam is passed through it and between them by means of tubes 11 provided in the bottom of the vat and the temperature is maintained at about 212 degrees Fahrenheit in the open vat for approximately fifteen hours. This solution is then slowly drained off through outlet pipe 12 controlled by valve 13, sufficient water being supplied in the meantime to keep the separators submerged. This process is continued for twelve or more hours, at which time the washing is stopped and sufficient sulphuric acid is added to neutralize the alkaline substance remaining in the separators. The washing process is then continued as above, five or more hours, or until the solution is practically pure water.

To this is then added approximately 5% of sodium bisulphite or other salts which by hydrolysis will effect the solution of any resinous or gummy materials, and live steam is passed through the solution by means of pipes 11 in such a manner as to cause ebullition to carry off coils and volatile materials freely. This operation is continued for approximately twelve hours and sufficient water supplied to keep the separators covered, the boiling process being continued by the admission of steam until a substantially clear and colorless solution is obtained in the vat. At the end of this operation, a small quantity of sulphuric acid is added by means of pipes 14 leading from container 15 and the separators are allowed to stand in this solution for three or more hours. This solution is then drained off slowly and the washing continued as described before, for three or more hours, when more sulphuric acid is added as before, completing the treatment.

Another method whereby the same result has been accomplished, is as follows:

Separators are placed in the manner described before and boiled for fifteen hours as in previous description, in a solution of sodium hydrate, or a mixture of sodium hydrate and carbonate. Oxides of sulphur are then admitted with the steam used in boiling. This process is continued until the solution is neutral. The boiling is then continued for twelve or more hours and the remainder of the treatment continued as in the first process. It is possible in this method to drain off all or any portion of the original solution of sodium hydrate and refill the vat with water to the original level, then introduce the oxides of sulphur.

Another method whereby the same result may be accomplished, is by the addition, after the first operation has been concluded, of salts of sulphuric or sulphurous acid and oxides of sulphur, in such a manner, as to form soluble products of the materials which are made accessible, by the first operation.

It will be understood that these are processes which have been used and will give satisfactory results. Nevertheless, any method of producing a solution which will produce soluble products may be used after the first process has been completed.

These methods of treatment accomplish the following results:

(1) The dilation of the wood cell structure, permitting the effective and thorough removal by solution and distillation of any resinous or other objectionable substances which may have been infiltrated during the growth of the wood.

(2) The setting or hardening of the cell structure after it has been softened or dilated enough to permit thorough removal of the objectionable materials so that the resulting separator is in firm mechanical condition; thus this method of treatment affords a wood separator which has extremely low electrical resistance, by reason of the complete and thorough removal made possible by the process described above, of objectionable substances, and which also has the very desirable property of a firm mechanical condition which will give extremely long life in service.

Having thus fully described my said invention, what I claim as new and desire to secure by Letters Patent, is:

1. The process of completely removing the foreign substances which have been occluded in the cell and infiltrated into the cell structure of the wood by means of subjecting such wood to an operation of dilation as described and to a combined solution and vaporization process by boiling in an open vat, first in a solution of sodium hydrate and carbonate, subsequently washing, neutralizing the remainder of such hydrate with sulphuric acid, adding a salt of sulphuric acid which will form soluble products of the substances it is desired to remove so that they may be washed out and the removal of volatile oils contained in such substances by means of live steam passing through the solution substantially as set forth.

2. In the manufacture of wood separators for storage batteries the process of completely removing from the wood, pore obstructing and infiltrated substances, by subjecting the wood to boiling in a solution of an alkali hydroxide producing compound, washing and neutralizing the remainder of this hydrate by the addition of a neutralizing agent and vaporizing off the volatile substances by passing live steam through the solution substantially as set forth.

3. In the manufacture of wood separators for storage batteries the process of removing the infiltrated and pore obstructing substances from the wood which consists first in submerging the wood in a solution of an alkali hydroxide producing compound, removing this solution by washing and neutralizing the portion remaining in the separators, and subsequent boiling in a solution containing a neutralizing compound, whereby the resinous and other objectionable materials are subjected to a combined solution and distillation substantially as set forth.

4. In the manufacture of wood separators for storage batteries, the process of reducing the wood to substantially pure cellulose which consists in boiling said wood in a solution of an alkali hydroxide producing compound and subsequent washing and neutralization of the small remaining portions of this hydrate and additional boiling in a solution of a neutralizing compound by which the objectionable substances are dissolved and vaporized so as to be entirely removed from the wood, substantially as set forth.

5. In the manufacture of wood separators for storage batteries, the process of reducing the wood to substantially pure cellulose, which consists in boiling the wood in a solution of an alkali hydroxide producing compound, thereby dilating the wood cell structure, exposing any infiltrated and occluded resins, gums, tannins, and other objectionable materials to the action of a neutralizing agent while these are maintained in a state of ebullition so that these objectionable substances are removed by solution and vaporization.

In witness whereof, I have hereunto set my hand at Indianapolis, Indiana, this twentieth day of October, A. D. nineteen hundred and twenty-two.

HORACE W. NORDYKE.